(12) United States Patent
Manabe (10) Patent No.: US 9,570,893 B2
(45) Date of Patent: Feb. 14, 2017

(54) CUTTING METHOD OF FLAT WIRE, AND CUTTING TOOL

(71) Applicant: Toyota Jidosha Kabushiki Kaisha, Toyota-shi (JP)

(72) Inventor: Hideki Manabe, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/812,023

(22) Filed: Jul. 29, 2015

(65) Prior Publication Data
US 2016/0036209 A1  Feb. 4, 2016

(30) Foreign Application Priority Data

Jul. 29, 2014  (JP) ................. 2014-154306

(51) Int. Cl.
| | | |
|---|---|---|
| *B32B 38/04* | (2006.01) | |
| *B32B 38/10* | (2006.01) | |
| *B32B 43/00* | (2006.01) | |
| *B26D 3/02* | (2006.01) | |
| *B26D 3/28* | (2006.01) | |
| *H02G 1/12* | (2006.01) | |

(52) U.S. Cl.
CPC .......... *H02G 1/1295* (2013.01); *H02G 1/1253* (2013.01)

(58) Field of Classification Search
USPC ........ 156/248, 701, 717, 718; 83/39, 51, 52, 83/581
See application file for complete search history.

(56) References Cited

U.S. PATENT DOCUMENTS

| | | | | |
|---|---|---|---|---|
| 3,686,753 | A * | 8/1972 | Baeslack ............. | H02G 1/1295 30/90.8 |
| 3,813,966 | A * | 6/1974 | Knuth ................. | H02G 1/1217 30/91.1 |
| 3,833,443 | A * | 9/1974 | Naseth ................ | H01B 7/08 156/289 |
| 3,881,248 | A * | 5/1975 | Kaufman ............ | H02G 1/1214 30/90.1 |
| 4,025,998 | A * | 5/1977 | Eppler ................. | H02G 1/005 29/566.4 |
| 4,140,360 | A * | 2/1979 | Huber ................. | H01R 12/675 439/497 |
| 4,187,745 | A * | 2/1980 | Lambert ............. | H02G 1/1265 81/9.51 |

(Continued)

FOREIGN PATENT DOCUMENTS

| | | |
|---|---|---|
| CN | 2084241 U | 9/1991 |
| JP | 62-203713 A | 9/1987 |

(Continued)

*Primary Examiner* — Sing P Chan
(74) *Attorney, Agent, or Firm* — Oblon, McClelland, Maier & Neustadt, L.L.P.

(57) ABSTRACT

A cutting method of the invention cuts a flat wire covered with a film, using a pair of first blades, and a second blade that is arranged between the pair of first blades. This cutting method includes a step of forming tapered cuts in an upper surface of the flat wire, by the pair of first blades cutting part way into the flat wire in a thickness direction, from the upper surface of the flat wire, and a step of cutting the flat wire by the second blade, between the two cuts, so as to form a chamfer on both side surfaces next to the upper surface of the flat wire.

4 Claims, 13 Drawing Sheets

(56) References Cited

U.S. PATENT DOCUMENTS

| | | | | | |
|---|---|---|---|---|---|
| 4,199,854 | A | * | 4/1980 | Bitting | H01B 13/0003 29/426.5 |
| 4,261,230 | A | * | 4/1981 | Sindelar | H02G 1/1248 81/9.51 |
| 4,283,971 | A | * | 8/1981 | Hetmanski | H01R 43/28 81/9.51 |
| 4,387,746 | A | * | 6/1983 | Meehan | H02G 1/005 140/105 |
| 4,395,928 | A | * | 8/1983 | Undin | H02G 1/1212 81/9.43 |
| 4,429,451 | A | * | 2/1984 | Angelico | H01R 43/015 29/33 M |
| 4,475,418 | A | * | 10/1984 | Tani | H02G 1/1212 81/9.41 |
| 4,572,250 | A | * | 2/1986 | Maben | H02G 1/1295 140/105 |
| 4,577,405 | A | * | 3/1986 | Butler | H02G 1/1236 30/90.1 |
| 4,713,874 | A | * | 12/1987 | Schwartz | H01R 43/0421 29/566.4 |
| 4,753,001 | A | * | 6/1988 | Alexander | H01B 15/005 29/825 |
| 4,852,433 | A | * | 8/1989 | Butler | H02G 1/127 30/346 |
| 4,993,147 | A | * | 2/1991 | Carpenter | G02B 6/4497 29/564.4 |
| 5,025,687 | A | * | 6/1991 | Butler | H02G 1/127 30/346 |
| 5,235,750 | A | * | 8/1993 | Brown | B23D 29/023 30/134 |
| 5,469,762 | A | * | 11/1995 | Krampe | H02G 1/1212 30/90.1 |
| 5,542,327 | A | * | 8/1996 | Schultz | H01B 15/006 29/426.4 |
| 5,979,272 | A | * | 11/1999 | Wollermann | H02G 1/1256 29/33 F |
| 6,079,105 | A | * | 6/2000 | Hollingsworth | H02G 1/1236 30/278 |
| 6,279,215 | B1 | * | 8/2001 | Nomoto | H01R 43/052 29/33 M |
| 7,360,472 | B2 | * | 4/2008 | Krampe | H02G 1/1212 81/9.4 |
| 2007/0006389 | A1 | * | 1/2007 | Cotter | B25B 7/02 7/107 |
| 2010/0201586 | A1 | * | 8/2010 | Michalk | H02G 1/1256 343/741 |
| 2014/0076498 | A1 | | 3/2014 | Sato | |

FOREIGN PATENT DOCUMENTS

| | | |
|---|---|---|
| JP | 2008-79433 A | 9/1987 |
| JP | 2014-60860 | 4/2014 |

\* cited by examiner

CUTTING METHOD OF FLAT WIRE, AND CUTTING TOOL

INCORPORATION BY REFERENCE

The disclosure of Japanese Patent Application No. 2014-154306 filed on Jul. 29, 2014 including the specification, drawings and abstract is incorporated herein by reference in its entirety.

BACKGROUND OF THE INVENTION

1. Field of the Invention

The invention relates to a cutting method of flat wire, and a cutting tool.

2. Description of Related Art

Japanese Patent Application Publication No. 2014-060860 (JP 2014-060860 A) describes film stripping device that strips a film from film-covered flat wire. The film stripping device described in JP 2014-060860 A has a rotating shaft that is parallel to a length direction of the flat wire, and transports the flat wire in a direction orthogonal to the rotating shaft. Then, with the flat wire positioned in the length direction, a plurality of processing means for carrying out processing in the same direction processes an end portion of the flat wire.

In this way, with the technology described in JP 2014-060860 A, a plurality of processing means processes the end portion of the flat wire. More specifically, the plurality of processing means involves chamfering a conductor of the flat wire, and stripping the film off of each side surface of the flat wire. Therefore, the number of processes is large, so the entire process is complicated. Furthermore, when chamfering the conducting wire and stripping off the film, processing must be done with a different cutting tool at different stations. That is, a station is required for each processing process, so a large number of stations are required.

Figure 12:
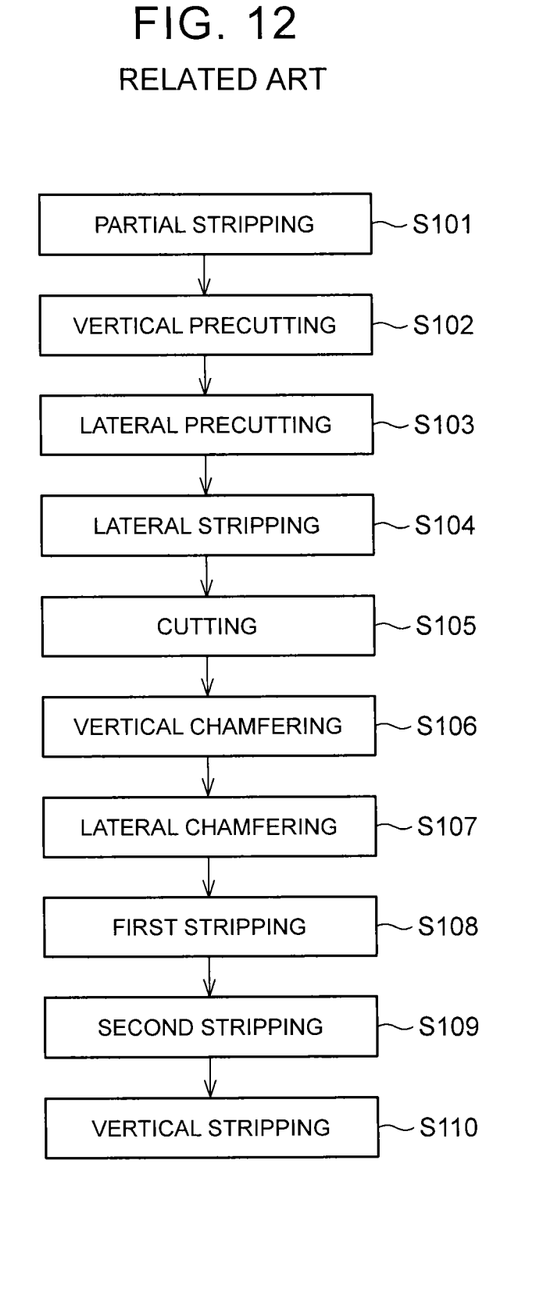
FIG. 12 is a flowchart illustrating a cutting method according to related art.
Figure 13:
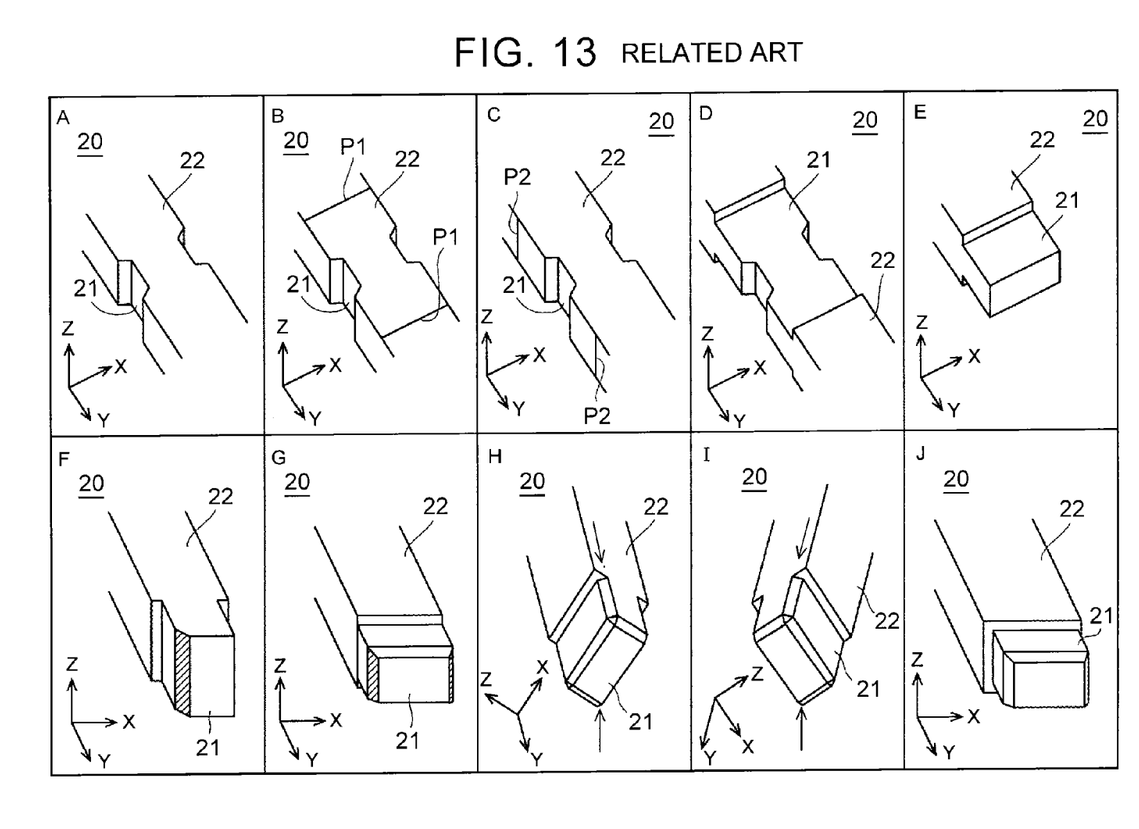
FIG. 13 is a view of the structure of a flat wire in each process of the cutting method according to the related art.

One example of a related cutting method will be described with reference to FIGS. 12 and 13. FIG. 12 is a flowchart illustrating a related cutting method. FIG. 13 is a perspective view of the structure of a flat wire 20 in the processing processes. The flat wire 20 is a film-covered flat wire in which a film 22 is provided on an outer periphery of a conductor portion 21. Also, in FIG. 13, the Y direction is the length direction of the flat wire 20, the X direction is the width direction, and the Z direction is the thickness direction.

First, in order to mark a cutting location, the film 22 is stripped at a portion of the cutting location (S101). As a result, a portion of the conductor portion 21 is exposed such that the structure shown in A of FIG. 13 is obtained. Then the film 22 is vertically precut (S102). The film 22 on two opposing side surfaces of the flat wire 20 is precut, such that the structure shown in B of FIG. 13 is obtained. Here, the film 22 is precut along two precut lines P1 that are parallel to the X direction.

Next, the film 22 is laterally precut (S103). As a result, the film 22 on the two remaining surfaces of the flat wire 20 is precut such that the structure shown in C of FIG. 13 is obtained. Here, the film 22 is precut at precut lines P2 that are parallel to the Z direction. In the Y direction, the precut lines P2 are in the same positions as the precut lines P1. Next, when the precut film 22 is laterally stripped (S104), the structure shown in D of FIG. 13 is obtained. Here, the film 22 is stripped between the two precut lines P1, on two opposing side surfaces of the flat wire 20. As a result, the conductor portion 21 is exposed. Then, when the flat wire 20 is cut (S105), the structure shown in E of FIG. 13 is obtained.

Next, chamfering is performed on the cut portion of the flat wire 20. Therefore, a tip end portion of the cut portion of the flat wire 20 is vertically chamfered (S106). Here, chamfering is performed on one end of the cut surface. As a result, the structure shown in F of FIG. 13 is obtained. In F of FIG. 13, the shaded area is chamfered. Next, a tip end portion of the cut portion of the flat wire 20 is laterally chamfered (S107). Here, chamfering is performed on both ends of the cut surface. As a result, the structure shown in G of FIG. 13 is obtained. In G of FIG. 13, the shaded areas are chamfered.

Next, the film 22 is stripped from corner portions of the chamfered tapered surface (S108). Here, the film 22 at the location indicated by the arrow in H of FIG. 13 is stripped off. Similarly, the film 22 is stripped from a corner portion of the chamfered tapered surface (S109). Here, the film 22 at the location indicated by the arrow in I of FIG. 13 is stripped off. Then, the film 22 of the two opposing side surfaces of the flat wire 20 is vertically stripped (S110). As a result, the film 22 of the entire cut portion of the flat wire 20 is stripped, such that the conductor portion 21 is exposed, as shown in J of FIG. 13.

In this way, the flat wire 20 is cut via 10 processing processes. Therefore, 10 different stations are required. A reduction in the number of processing processes is desired to reduce the number of stations.

Figure 14A:
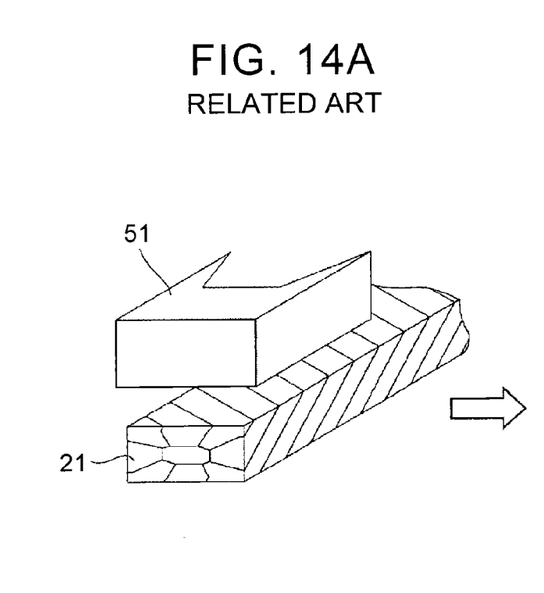
FIGS. 14A to 14C are views illustrating a problem that occurs when cutting a conducting wire assembly.
Figure 14B:
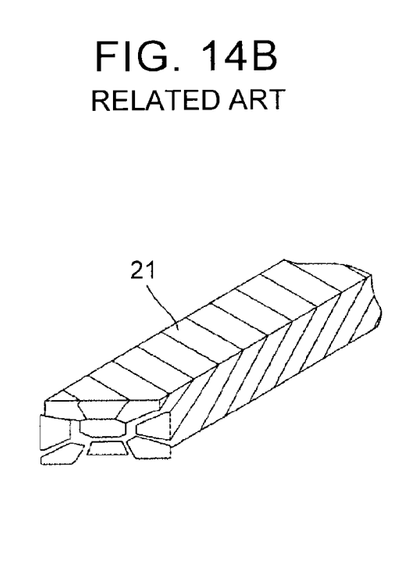
Figure 14C:
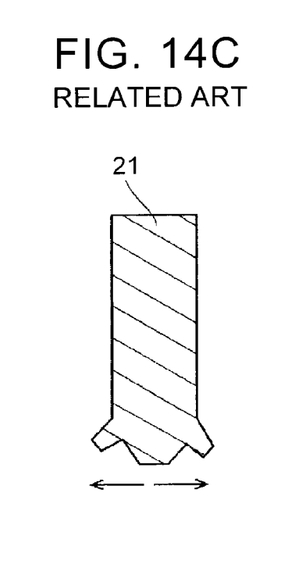

Moreover, when the conductor portion 21 is formed from a conducting wire assembly, each twisted wire is independent. Therefore, when the flat wire 20 without the film is cut by a cutting tool 51, as shown in FIG. 14A, the twisted wires of the conducting wire assembly may separate, as shown in FIG. 14B, from the cutting force of the cutting tool 51, or the end portion of the cut location may deform, as shown in FIG. 14C, from the cutting force of the cutting tool 51.

SUMMARY OF THE INVENTION

The invention thus provides a cutting method, and a cutting tool, capable of easily cutting a flat wire covered with a film.

A first aspect of the invention relates to a cutting method for cutting a flat wire covered with a film, using a pair of first blades, and a second blade that is arranged between the pair of first blades. This cutting method includes a step of forming tapered cuts in an upper surface of the flat wire, by the pair of first blades cutting part way into the flat wire in a thickness direction, from the upper surface of the flat wire, and a step of cutting the flat wire by the second blade, between the two cuts, so as to form a chamfer on both side surfaces next to the upper surface of the flat wire. This cutting method may also include a step of precutting the film along an outer periphery of the flat wire, after cutting the flat wire, and a step of pulling the precut film off of the flat wire. Also, in the cutting method described above, the film may be precut by moving a round blade along the outer periphery of the flat wire in the step of precutting the film.

A second aspect of the invention relates to a cutting tool that cuts a flat wire. This cutting tool includes a pair of first blades, and a second blade arranged between the pair of first blades. A tapered surface that becomes thinner toward a tip end side is formed on a tip end portion of each of the two first blades, the tapered surfaces of the pair of first blades are arranged so as to come closer to each other farther toward the tip end side, and an inclined surface to provide a chamfer on both side surfaces of the flat wire is formed on the second blade.

The invention makes it possible to provide a cutting method, and a cutting tool, capable of easily cutting a flat wire covered with a film.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the cutting method and cutting tool according to the invention will be described in detail with reference to the accompanying drawings. However, the invention is in no way limited to the example embodiments described below. Also, to make the description clearer, the following description and drawings are simplified as appropriate. In the drawings, structures that are essentially the same are denoted by like reference characters.

Figure 1:
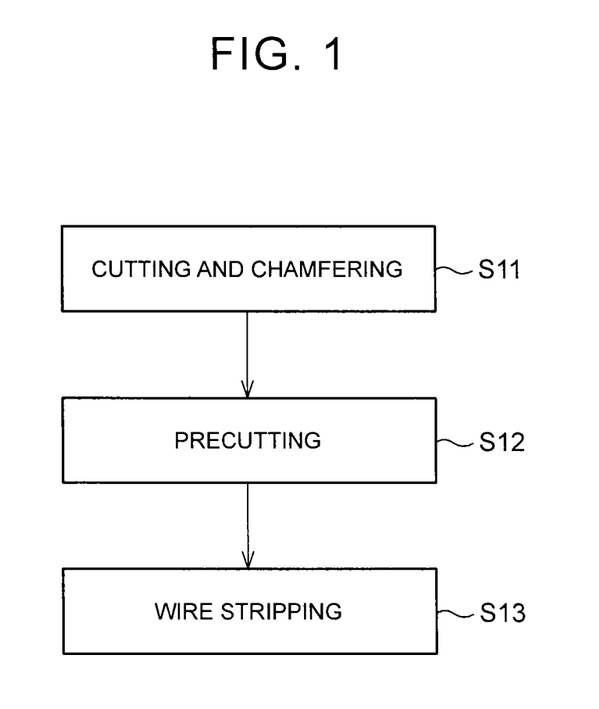
FIG. 1 is a flowchart illustrating a cutting method of a flat wire according to the example embodiment of the invention.

The cutting method according to this example embodiment cuts a film-covered flat wire using a cutting tool. FIG. 1 is a flowchart illustrating this cutting method. First, the flat wire is cut and chamfered (S11) using the cutting tool according to the example embodiment. Then, after the film has been precut (S12), wire stripping is performed (S13). By doing this, the film of the flat wire is able to be stripped off.

Figure 2:
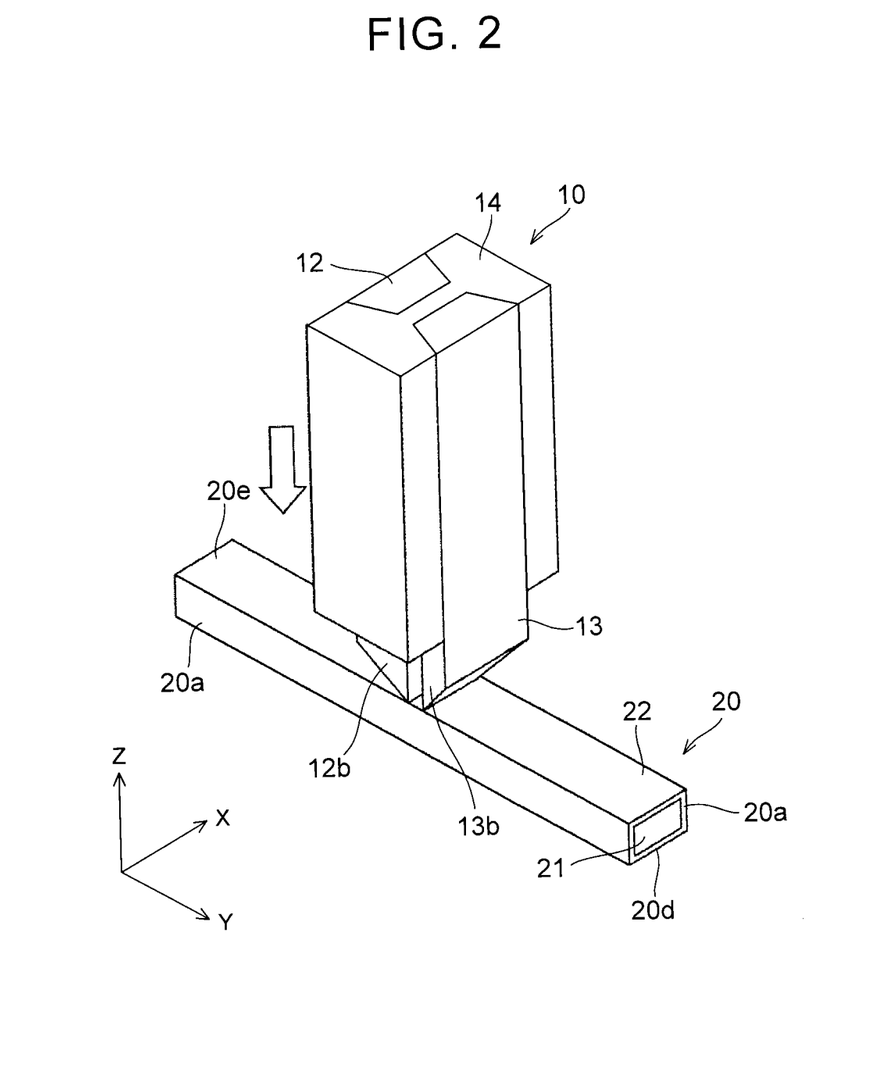
FIG. 2 is a perspective view of a cutting tool according to the example embodiment.
Figure 3:
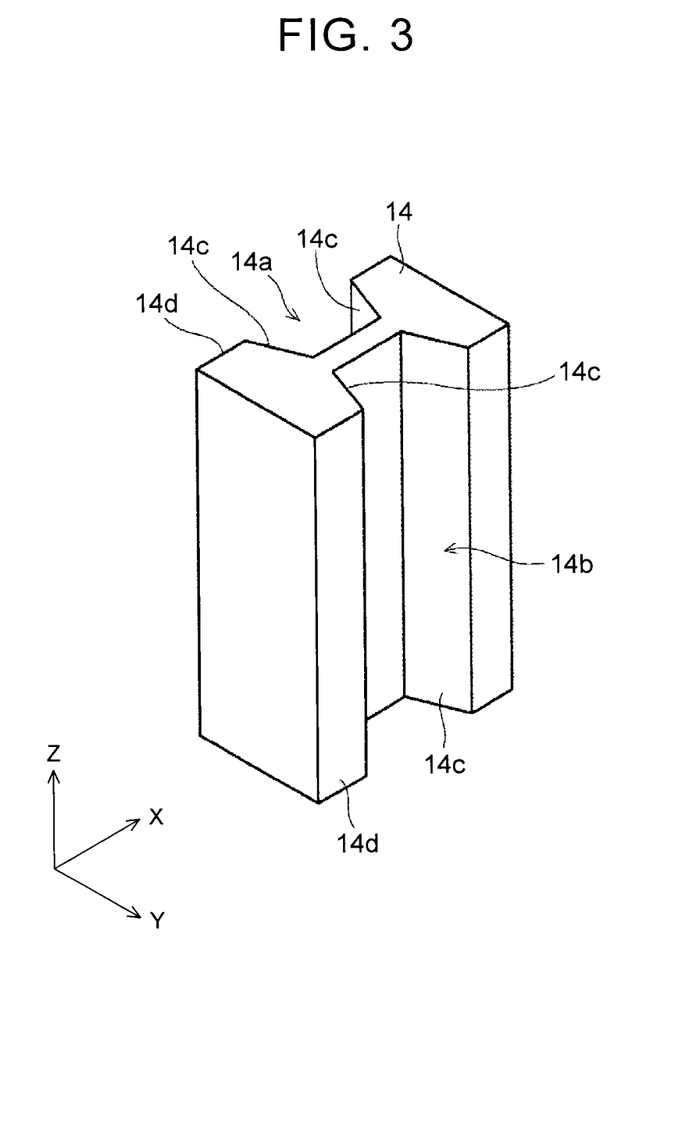
FIG. 3 is a perspective view of the structure of a first blade of the cutting tool.
Figure 4:
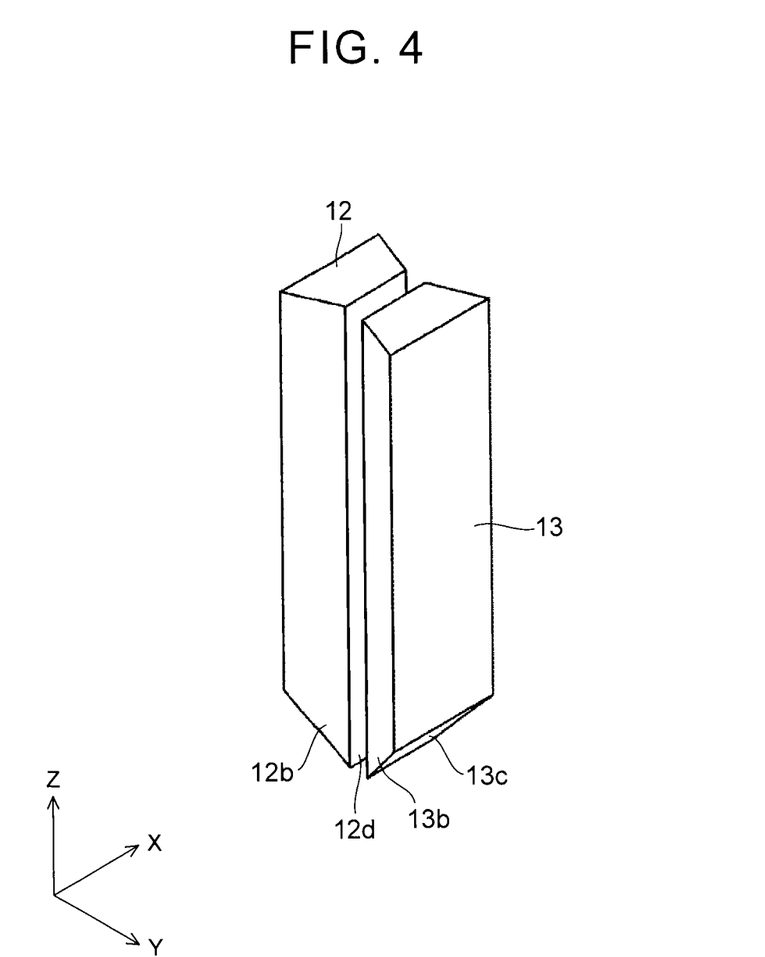
FIG. 4 is a perspective view of the structure of a second blade of the cutting tool.
Figure 5A:
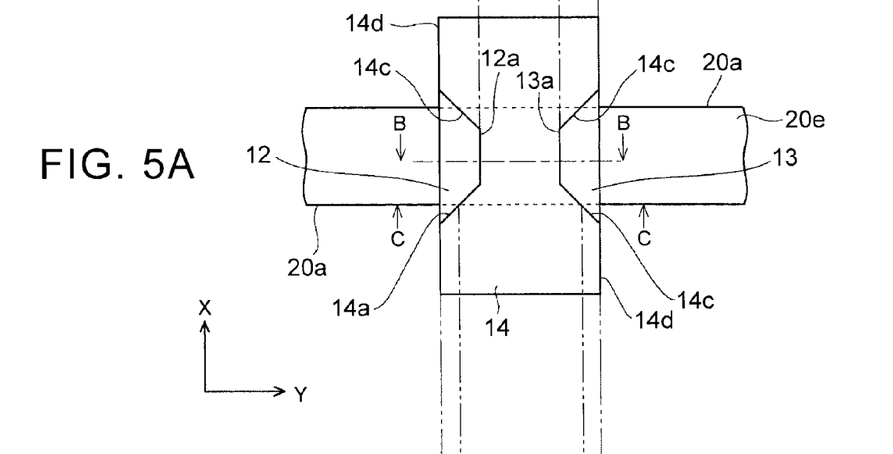
FIGS. 5A to 5C are plan views and sectional views of the cutting tool according to the example embodiment.
Figure 5B:
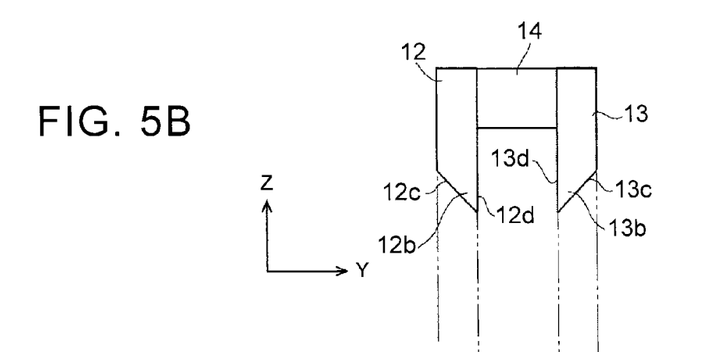
Figure 5C:
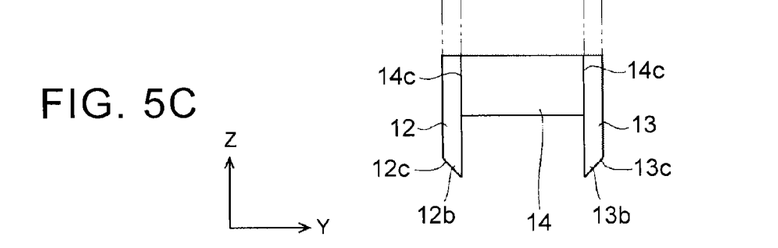

First, the structure of a cutting tool 10 used in step S11 will be described with reference to FIGS. 2 to 5. FIG. 2 is a perspective view of the structure of the cutting tool 10 arranged above a flat wire 20. The cutting tool 10 includes a pair of first blades 12 and 13 and a second blade 14, as shown in FIG. 2. FIG. 3 is a perspective view of the second blade 14, and FIG. 4 is a perspective view of the first blades 12 and 13. FIG. 5A is a plan view of the cutting tool 10 arranged above the flat wire 20, and FIGS. 5B and 5C are side sectional views. Also, in FIGS. 5B and 5C, the flat wire 20 is omitted.

In the description below, a XYZ Cartesian coordinate system in which a width direction of the flat wire 20 is the X direction, a length direction of the flat wire 20 is the Y direction, and a thickness direction of the flat wire 20 is the Z direction, is used. Here, the flat wire 20 is cut by arranging the cutting tool 10 above the flat wire 20, and then lowering the cutting tool 10. For example, the cutting tool 10 cuts the flat wire 20 by processing equipment moving the cutting tool 10 downward (in the −Z direction) by an actuator such as a motor. In other words, the direction in which the cutting tool 10 moves is the thickness direction of the flat wire 20.

The flat wire 20 is a film-covered flat wire that has a conductor portion 21 and a film 22. The film 22 covers the entire outer peripheral surface of the conductor portion 21. The film 22 is a powder coating made of insulating resin such as polyimide or PFA. Here, the width of the conductor portion 21 in the X direction is approximately 3 to 4 mm, and the thickness of the conductor portion 21 in the Z direction is approximately 2 to 3 mm. The thickness of the film 22 is approximately 0.1 mm. The conductor portion 21 is also able to be made into a conducting wire assembly formed from a plurality of conducting wires. As shown in FIG. 2, a surface on the cutting tool 10 side of the flat wire 20 is an upper surface 20e, surfaces next to the upper surface 20e are side surfaces 20a, and a surface on the side opposite the upper surface 20e is a lower surface 20d.

The second blade 14 is arranged between the pair of first blades 12 and 13, in the Y direction. That is, the first blades 12 and 13 are arranged sandwiching the second blade 14. The processing equipment holds the pair of first blades 12 and 13 and the second blade 14 together as a single unit. The cutting tool 10 is provided so as to be able to move in the Z direction. Furthermore, the second blade 14 moves independently from the first blade 12 and the first blade 13. That is, the processing equipment is able to move only the second blade 14, while fixing the positions of the first blades 12 and 13. The second blade 14 and the first blades 12 and 13 are made of HAP material or super steel material, for example.

The two first blades 12 and 13 are arranged apart from each other in the Y direction. Also, the second blade 14 is arranged between these two first blades 12 and 13. More specifically, recessed portions 14a and 14b for arranging the first blades 12 and 13 are provided in the second blade 14, as shown in FIG. 3. The recessed portions 14a and 14b are provided on side surfaces 14d that are parallel to the XZ plane. In this way, the second blade 14 has the recessed portions 14a and 14b formed in the two opposing side surfaces 14d of a cuboid. The first blade 12 is arranged in the recessed portion 14a, and the first blade 13 is arranged in the recessed portion 14b.

As shown in FIG. 5A, the first blades 12 and 13 each have a trapezoidal shape, for example, in a XY plane view. Also, the first blade 12 has the same shape as the first blade 13, and the first blades 12 and 13 are arranged symmetrically. More specifically, the first blade 12 is arranged symmetrical to the first blade 13, with respect to a plane that is parallel to the XZ plane. The first blades 12 and 13 are arranged such that short bottom sides 12a and 13a of the first blades 12 and 13, respectively, face each other in a XY plane view. Therefore, the farther apart the first blades 12 and 13 are from each other, the wider the width in the X direction of the first blades 12 and 13 becomes. The first blade 12 has a symmetrical shape with respect to a plane that is parallel to the YZ plane. The first blade 13 also has a symmetrical shape with respect to a plane that is parallel to the YZ plane.

The recessed portions 14a and 14b of the second blade 14 have shapes corresponding to the first blades 12 and 13 so as to be able to house the first blades 12 and 13, respectively. The recessed portions 14a and 14b each have a trapezoidal shape in a XY plane view. Therefore, the two opposing surfaces of the recessed portions 14a and 14b are inclined surfaces 14c, as shown in FIGS. 2 and 5A. The inclined surfaces 14c are parallel to the Z direction and are inclined 45° with respect to the XZ plane. The first blades 12 and 13 are arranged with almost no gap between them and the second blade 14. Therefore, the cutting tool 10 has a rectangular shape in the XY plane view, as shown in FIG. 5A.

Inclined surfaces 14c are arranged above the side surfaces 20a of the flat wire 20, as shown in FIG. 5A. The inclined surfaces 14c cut into the side surfaces 20a of the flat wire 20. The inclined surfaces 14c form chamfers on the side surfaces 20a of the flat wire 20, by cutting the flat wire 20 using the second blade 14. That is, chamfers according to the inclination angle of the inclined surfaces 14c are formed in the side surfaces 20a.

Tip end portions 12b and 13b that protrude from the second blade 14 are provided on the flat wire 20 side of the first blades 12 and 13, as shown in FIGS. 2 and 4. Lower ends of the first blades 12 and 13 are positioned farther to the −Z side than the lower end of the second blade 14. Tapered surfaces 12c and 13c are provided on the tip end portions 12b and 13b, as shown in FIG. 5B and the like. That is, the tip end portions 12b and 13b have tapered shapes in which the thickness in the Y direction becomes thinner toward the −Z side.

The tapered surface 12c is provided on the opposite side of the first blade 12 than the first blade 13 side. The tapered surface 13c is provided on the opposite side of the first blade 13 than the first blade 12 side. Therefore, the tapered surface 12c of the first blade 12 is provided so as to approach the first blade 13 farther toward the −Z side. Similarly, the tapered surface 13c of the first blade 13 is provided so as to approach the first blade 12 farther toward the −Z side. In this way, the first blade 13 is provided in a trapezoidal columnar shape, and a tip end portion 13b having the tapered surface 13c is provided on a lower end thereof. The first blade 12 also has the same shape as the first blade 13.

A facing surface 12d arranged on a side opposite the tapered surface 12c of the first blade 12 includes a short bottom side 12a, and is a facing surface that is parallel to the XZ plane. A facing surface 13d that is arranged on the opposite side of the first blade 13 than the tapered surface 13c, includes a short bottom side 13a, and is a surface that is parallel to the XZ plane. For example, the angle formed between the tapered surface 12c and the facing surface 12d is 45°. Similarly, the angle formed between the tapered surface 13c and the facing surface 13d is 45°. The facing surface 12d and the facing surface 13d are arranged facing each other. Also, the second blade 14 is sandwiched between the facing surface 12d and the facing surface 13d. For example, the distance between the facing surface 12d and the facing surface 13d in the Y direction is approximately 1 mm.

Figure 6A:
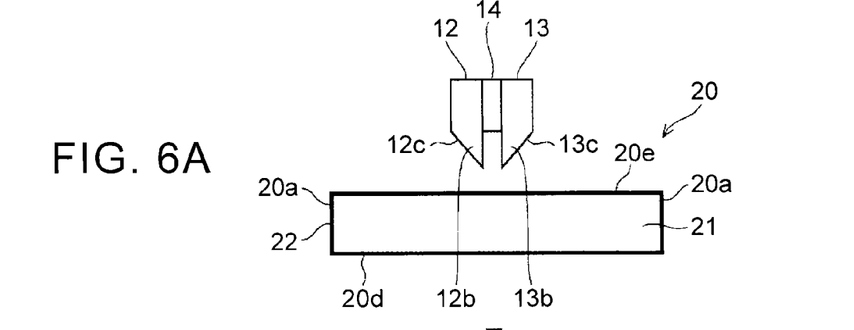
FIGS. 6A to 6C are process sectional views illustrating the manner in which flat wire is cut by the cutting tool.

Now, the process (S11) of cutting and chamfering the flat wire 20 using the cutting tool 10 having the structure described above will be described with reference to FIG. 6. FIG. 6 is a process sectional view of a cutting process of the flat wire 20. First, the cutting tool 10 brought toward the flat wire 20, as shown in FIG. 6A. That is, the processing equipment moves the cutting tool 10 in the −Z direction, with the second blade 14 and the first blades 12 and 13 as a single unit. As a result, the tip end portions 12b and 13b of the first blades 12 and 13 contact the upper surface 20e of the flat wire 20.

Figure 6B:
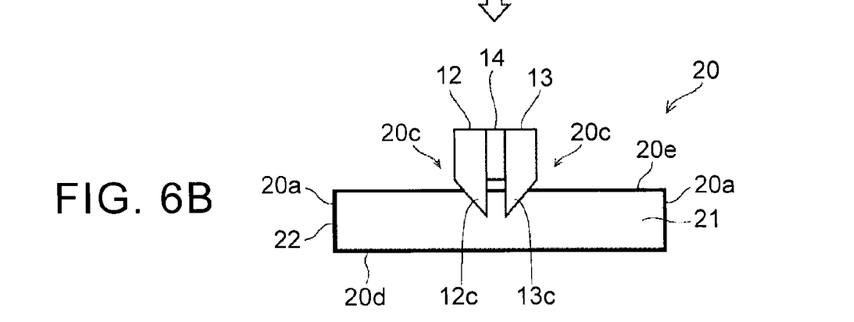

The cutting tool 10 moves farther in the −Z direction, and the tip end portions 12b and 13b of the first blades 12 and 13 cut into a portion of the flat wire 20. That is, the first blades 12 and 13 cut into the flat wire 20 a predetermined distance from the upper surface 20e of the flat wire 20, as shown in FIG. 6B. As a result, the tip end portions 12b and 13b form cuts 20c in the flat wire 20 until midway in the Z direction. Consequently, two cuts 20c are formed in the upper surface 20e of the flat wire 20. The depth of these cuts 20c in the flat wire 20 is greater than the thickness of the film 22 of the flat wire 20. The tip end portions 12b and 13b reach the conductor portion 21, and the cuts 20c are formed in the flat wire 20.

In this way, the tapered cuts 20c are formed in the upper surface 20e of the flat wire 20, by the pair of first blades 12 and 13 cutting partway into the upper surface 20e of the flat wire 20 in the thickness direction. For example, the depth of the cuts 20c may be 0.5 mm. The cuts 20c are tapered because they are shapes corresponding to the tapered surfaces 12c and 13c. The tapered surfaces 12c and 13c are inclined 45°, so the angle of the cuts 20c is approximately 45°. At this time, the second blade 14 are not contacting the flat wire 20.

Figure 6C:
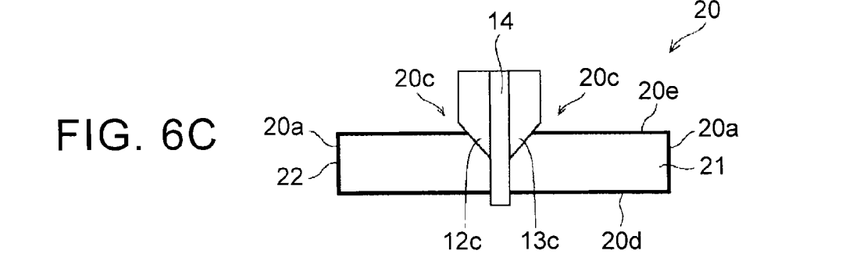

Next, when only the second blade 14 is moved in the −Z direction, the state is as shown in FIG. 6C. More specifically, the processing equipment moves the second blade 14 while fixing the positions of the first blades 12 and 13. The second blade 14 cuts into the flat wire 20 from the upper surface 20e of the flat wire 20 until it reaches the lower surface 20d. Therefore, the flat wire 20 is cut between the two cuts 20c formed by the flat wire 20. After the flat wire 20 is cut, the cutting tool 10 is raised and moved away from the flat wire 20.

In the state shown in FIG. 6C, a chamfer is able to be formed on the flat wire 20 by the inclined surfaces 14c provided on the second blade 14. The flat wire 20 is cut by the second blade 14 between the two cuts 20c such that the chamfer is formed on both side surfaces 20a of the flat wire 20.

Figure 7:
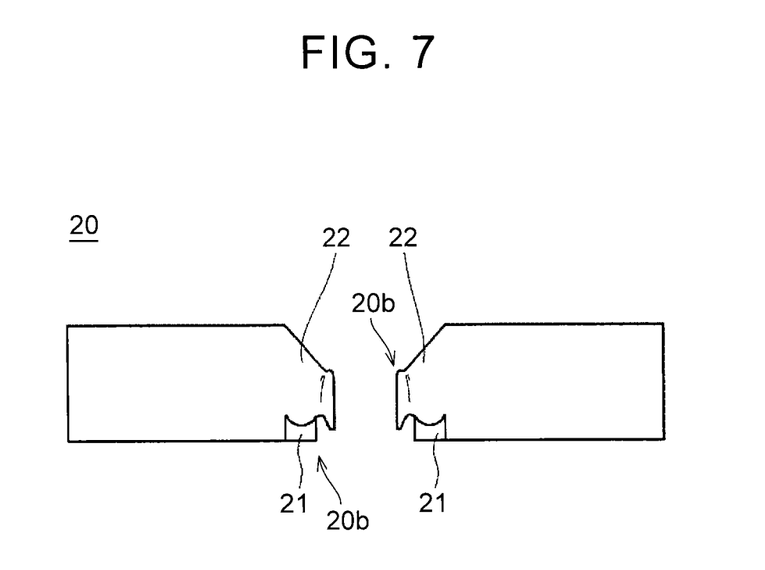
FIG. 7 is a view of a crushed covering of the flat wire.

In actuality, at a cut portion 20b of the flat wire 20, the film 22 is crushed, as shown in FIG. 7. That is, the film 22 gets pressed and crushed, and ends up deforming, by the second blade 14 and the first blades 12 and 13 cutting into the flat wire 20. Immediately after cutting, the film 22 is pressed and crushed, and the film 22 ends up remaining in the cut portion 20b. As a result, it becomes difficult to strip off the film 22 due to the cutting tool 10. Thus, in this example embodiment, the film 22 is stripped from the conductor portion 21 by the precutting process (S12) and the wire stripping process (S13).

Figure 8A:
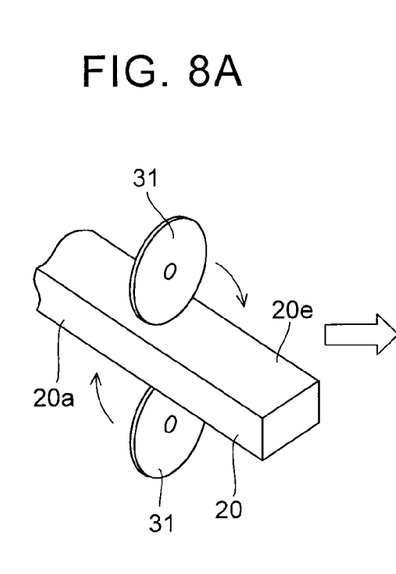
FIGS. 8A to 8C are perspective views illustrating a precutting process, and a wire stripping process.
Figure 8B:
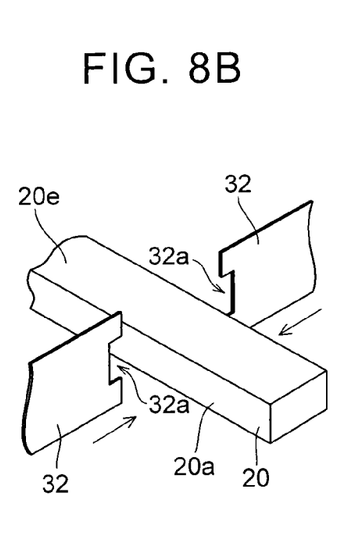
Figure 8C:
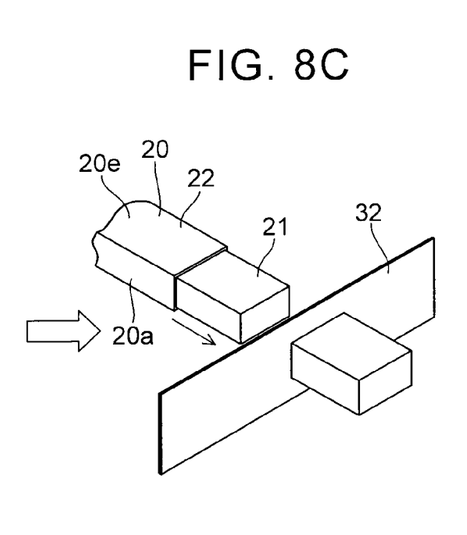

The precutting process and the wire stripping process will now be described with reference to FIG. 8. FIG. 8 is a perspective view of the structure of the flat wire 20 in the precutting process and the wire stripping process. In FIG. 8, the structure of the cutting location of the flat wire 20 that has been cut by the cutting tool 10 is shown simplified.

Figure 9:
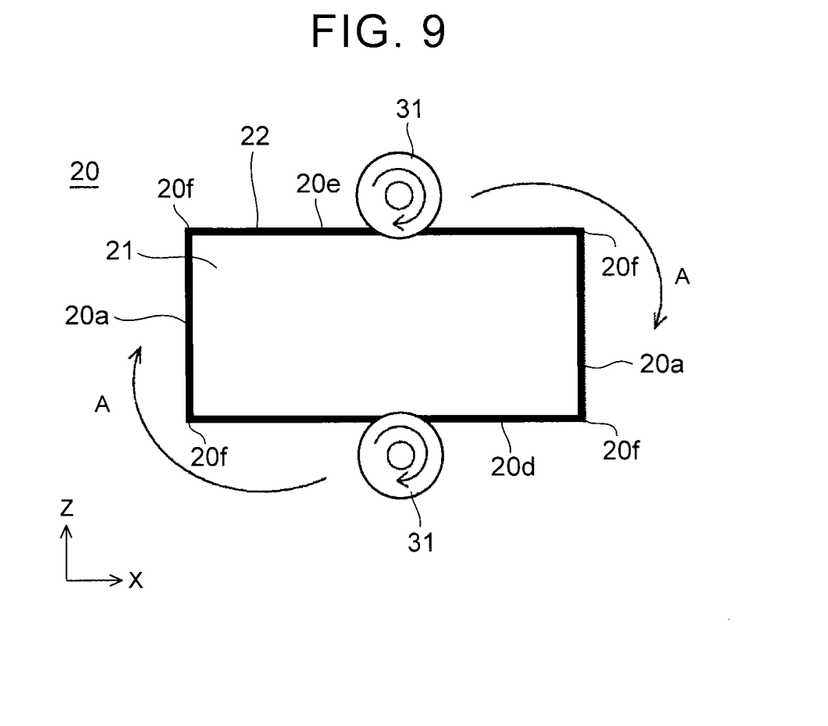
FIG. 9 is a view of the operation of a round blade in the precutting process.

After the flat wire 20 is cut by the cutting tool 10, the film 22 of the flat wire 20 is precut (S12). Here, a rotating round blade 31 moves along the outer periphery of the flat wire 20, as shown in FIG. 8A. As a result, the film 22 is precut. For example, two of the round blades 31 are arranged on opposite sides of the flat wire 20, as shown in FIG. 9. Then, the two round blades 31 move in the direction of arrow A while contacting the outer peripheral surface of the flat wire 20. The round blades 31 move in the XZ plane. More specifically, each of the round blades 31 moves to the position where the other round blade 31 started to move. As a result, the film 22 is precut along the entire periphery of the flat wire 20, i.e., on two side surfaces 20a, the upper surface 20e, and the lower surface 20d of the flat wire 20.

Moreover, the round blades 31 move so as to cut across corner portions 20f of the flat wire 20. For example, one round blade 31 moves clockwise from the center of the upper surface 20e to the center of the lower surface 20d of the flat wire 20, and the other round blade 31 moves counterclockwise from the center of the lower surface 20d to the center of the upper surface 20e of the flat wire 20. One of the round blades 31 precuts the upper right and lower right corner portions 20f of the flat wire 20, and the other round blade 31 precuts the upper left and lower left corner portions 20f of the flat wire 20. In this way, the round blades 31 move in order in the X direction, the Z direction, and the X direction. Therefore, at the four corner portions 20f, the round blades 31 precut the film 22 from two directions, i.e., the X direction and the Z direction. As a result, the film 22 is able to be reliably precut along the entire periphery of the flat wire 20.

After the film 22 has been precut, the film 22 is wire stripped (S13). For example, stripping blades 32 are inserted, as shown in FIG. 8B, in the location where the film 22 has been precut. Then the two stripping blades 32 are moved toward one another in the X direction. An open portion 32a corresponding to the size of the conductor portion 21 is formed in each of the stripping blades 32, so the two stripping blades 32 pinch the conductor portion 21 of the flat wire 20.

Figure 10:
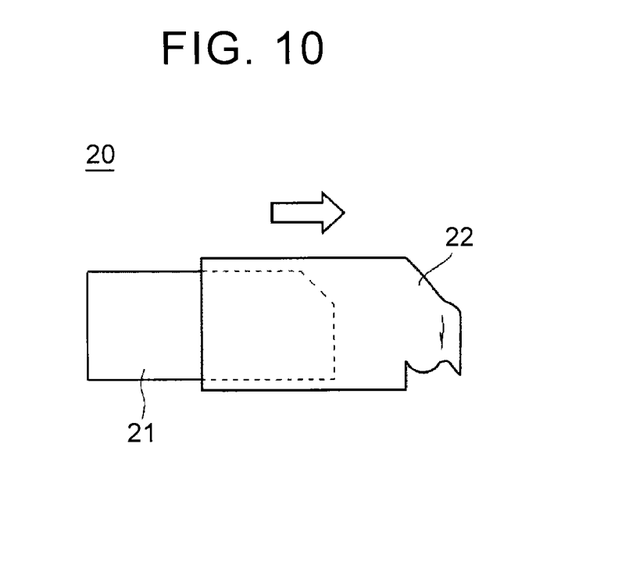
FIG. 10 is a side view illustrating the manner in which the covering is stripped off of the flat wire.

With the stripping blades 32 inserted in the precut location of the film 22, the two stripping blades 32 are pulled off of the flat wire 20. That is, the film 22 is stripped off of the flat wire 20 by moving the stripping blades 32 in the +Y direction, as shown in FIG. 8C. In this example embodiment, the stripping blades 32 are used, so the film 22 is able to be pulled off all at once, as shown in FIG. 10. As a result, the film 22 is able to be stripped off without any remaining on the cut portion 20b of the flat wire 20. That is, the film 22 that has deformed by being cut by the cutting tool 1 is able to be stripped off all at once. Therefore, the process is able to be simplified.

The film 22 may also be precut in the Y direction before the film 22 is stripped off by the stripping blades 32. For example, precutting in the Y direction is performed on the two side surfaces 20a, the upper surface 20e, and the lower surface 20d of the flat wire 20. Doing so enables the film 22 to be stripped off more easily.

In this way, the flat wire 20 is able to be easily cut, and the film 22 is able to be easily stripped off, through the cutting and chamfering process (S11), the precutting process (S12), and the wire stripping process (S13). The 10 processes shown in FIG. 13 are able to be consolidated into three processes. More specifically, the three processes of steps S101 to S103 in FIG. 13 are consolidated into one process of step S12. Further, the three processes of steps S105 to S107 are consolidated into one process of step S11. The four processes of step S104 and steps S108 to S110 are consolidated into one process of step S13. Reducing the number of processes in this way makes cutting easier.

Consequently, the number of processing equipment stations is able to be reduced. For example, the cutting tool 10 performs cutting and chamfering all together. For example, cutting and chamfering are able to be performed at one station. Moreover, precutting and stripping of the film 22 are able to be performed at two stations. Therefore, only three stations are required, so the number of processing equipment stations is able to be significantly reduced. As a result, a significant reduction in the processes is possible.

Also, the cutting tool 10 cuts and chamfers the flat wire 20 with the film 22 on. Therefore, the conductor portion 21 is able to be prevented from deforming even when it is cut by the cutting tool 10. Furthermore, even when a conducting wire assembly is used for the conductor portion 21 of the flat wire 20, the flat wire 20 is cut with the film 22 on, so the twisted wires of the conducting wire assembly are able to be prevented from separating. Therefore, the flat wire 20 is able to be cut with a good cutting shape, even without flattening or hardening the tip end portion. Thus, a welding process or the like after cutting is able to be appropriately performed. As a result, productivity is able to be improved.

Figure 11:
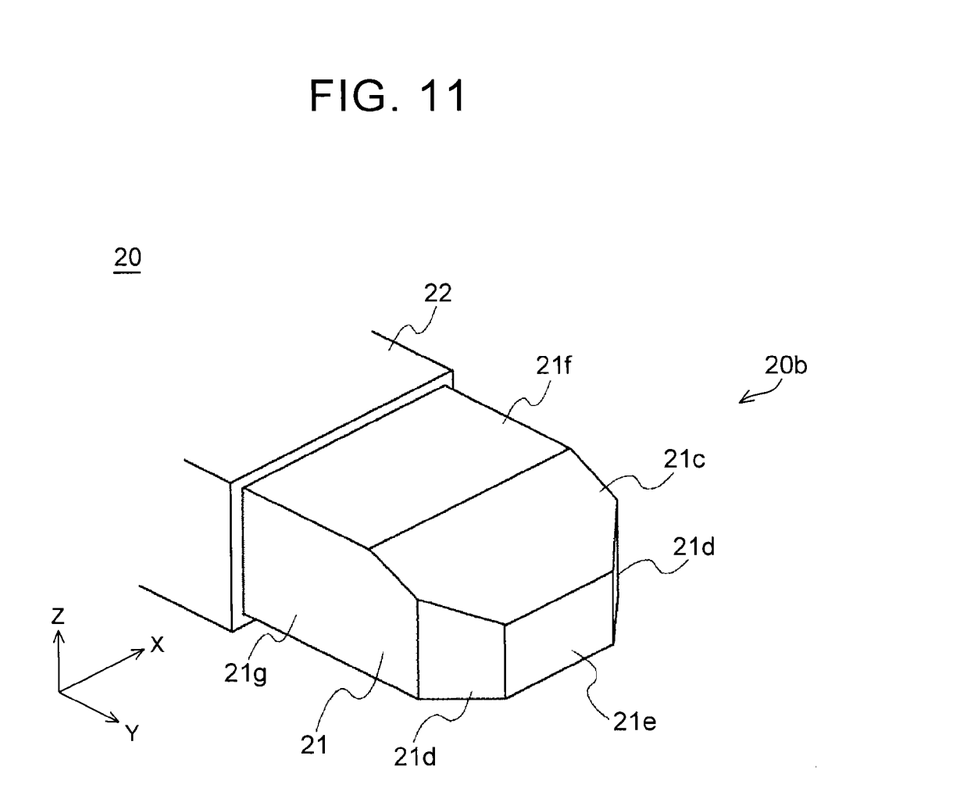
FIG. 11 is a perspective view of the structure of the flat wire after being cut.

The flat wire 20 that is cut through the process described above will now be described with reference to FIG. 11. FIG. 11 is a perspective view of the cut portion 20b of the flat wire 20.

A cut surface 21e, a chamfered portion 21c, and chamfered portions 21d are provided on the conductor portion 21, at the cut portion 20b of the flat wire 20. The cut surface 21e is a surface that has been cut, and is parallel to the XZ plane. The chamfered portions 21d are provided on both sides of the cut surface 21e in the X direction. The chamfered portions 21d are surfaces that are inclined from the cut surface 21e, and are formed by the inclined surfaces 14c. The chamfered portions 21d are provided on both side surfaces of the conductor portion 21, and are inclined from the side surfaces 20a of the flat wire 20. The chamfered portions 21d are inclined 45° from the side surfaces 20a. The conductor portion 21 is tapered at the cut portion 20b. Therefore, the width of the conductor portion 21 in the X direction becomes smaller closer to the cut surface 21e in the Y direction.

The chamfered portion 21c is provided on the +Z side of the cut surface 21e and the chamfered portions 21d. The chamfered portion 21c is formed by the tapered surface 12c of the first blade 12. That is, the chamfered portion 21c corresponds to the cuts 20c provided by the tapered surface 12c, and are formed parallel to the tapered surface 12c. The chamfered portion 21c is inclined 45° from an upper surface 21f. The conductor portion 21 is tapered at the cut portion 20b. The thickness of the conductor portion 21 in the Z direction becomes thinner closer to the cut surface 21e in the Y direction.

In this way, the chamfered portions 21c and 21d are able to be formed by cutting the flat wire 20 using the cutting tool 10. The chamfered portion 21c is tapered from the upper surface 21f toward the cut surface 21e of the conductor portion 21. The chamfered portions 21d are tapered from side surfaces 21g toward the cut surface 21e of the conductor portion 21. In this way, the upper surface 21f and the side surfaces 21g of the conductor portion 21 all have chamfered shapes, and a tip end of the flat wire 20 in the Y direction becomes the cut surface 21e that is parallel to the XZ plane. In this way, the flat wire 20 in which three corner portions of the cut surface 21e have been chamfered is able to be easily manufactured.

The dimensions, angles, and materials of the cutting tool 10 described above are suitable examples, but are not limited to the structure described above. Flat wire cut according to the cutting method described above may be used in a segment coil of a stator coil, for example. Consequently, the segment coil is able to be produced with high productivity. The invention is not limited to the example embodiments described above, and may be modified as appropriate without departing from the scope thereof.

What is claimed is:

1. A cutting method for cutting a flat wire covered with a film, using a pair of first blades, and a second blade that is arranged between the pair of first blades, comprising:
   a step of forming tapered cuts in an upper surface of the flat wire, by the pair of first blades cutting part way into the flat wire in a thickness direction, from the upper surface of the flat wire; and
   a step of cutting the flat wire by the second blade, between the two cuts, so as to form a chamfer on both side surfaces next to the upper surface of the flat wire.

2. The cutting method according to claim 1, further comprising:
   a step of precutting the film along the outer periphery of the flat wire, after cutting the flat wire; and
   a step of pulling the precut film off of the flat wire.

3. The cutting method according to claim 2, wherein
   the film is precut by moving a round blade along the outer periphery of the flat wire in the step of precutting the film.

4. A cutting tool that cuts a flat wire, comprising:
   a pair of first blades; and
   a second blade arranged between the pair of first blades,
   wherein a tapered surface that becomes thinner toward a tip end side is formed on a tip end portion of each of the two first blades;
   the tapered surfaces of the pair of first blades are arranged so as to come closer to each other farther toward the tip end side; and
   an inclined surface to provide a chamfer on both side surfaces of the flat wire is formed on the second blade.

* * * * *